under 35 U.S.C. 154(b) by 881 days.

(12) United States Patent
Rao et al.

(10) Patent No.: US 10,628,483 B1
(45) Date of Patent: Apr. 21, 2020

(54) ENTITY RESOLUTION WITH RANKING

(71) Applicant: Amazon Technologies, Inc., Reno, NV (US)

(72) Inventors: Delip Rao, Seattle, WA (US); Christian Darrel Monson, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 881 days.

(21) Appl. No.: 14/454,270

(22) Filed: Aug. 7, 2014

(51) Int. Cl.
*G06F 16/00* (2019.01)
*G06F 16/683* (2019.01)
*G06F 16/33* (2019.01)

(52) U.S. Cl.
CPC ........ *G06F 16/683* (2019.01); *G06F 16/3334* (2019.01)

(58) Field of Classification Search
CPC .... G06F 17/21; G06F 17/278; G06F 17/2745; G06F 16/683; G06F 16/3334; G06F 16/24578; G06F 16/9535; G06F 16/248; G06F 16/951; G06F 16/334; G06F 16/685; G06F 16/7834; G06F 16/313; G06F 16/3344; G06F 17/27; G06F 17/2705; G06F 17/2785; G06F 17/28
See application file for complete search history.

(56) References Cited

U.S. PATENT DOCUMENTS

| | | | | |
|---|---|---|---|---|
| 7,792,837 B1 * | 9/2010 | Zhao | ...................... | G06F 16/313 707/738 |
| 8,290,925 B1 * | 10/2012 | Anandan | ............... | G06F 16/313 707/707 |
| 8,666,914 B1 * | 3/2014 | Dupin | ................. | G06F 16/3346 706/12 |
| 9,201,927 B1 * | 12/2015 | Zhang | ................... | G06F 17/271 |
| 9,275,132 B2 * | 3/2016 | Roberts | .................... | G06F 16/93 |
| 2009/0083262 A1 * | 3/2009 | Chang | ................. | G06F 16/9535 |
| 2009/0144609 A1 * | 6/2009 | Liang | ..................... | G06F 17/21 715/230 |
| 2012/0072287 A1 * | 3/2012 | Crane | ................ | G06Q 30/0261 705/14.58 |
| 2014/0201126 A1 * | 7/2014 | Zadeh | .................. | A61B 5/4803 706/52 |
| 2015/0052115 A1 * | 2/2015 | Sharifi | ............... | G06Q 30/0631 707/722 |
| 2015/0286747 A1 * | 10/2015 | Anastasakos | ....... | G06F 16/9017 707/776 |

OTHER PUBLICATIONS

Rao et al., Entity Linking: Finding Extracted Entities in a Knowledge Base, a book chapter in Multi-source, Multi-lingual Information Extraction and Summarization, 2011.
Dredze et al., Entity Disambiguation for Knowledge Base Population, in Proceedings of Conference on Computational Linguistics (COLING), 2010.

* cited by examiner

*Primary Examiner* — Merilyn P Nguyen
(74) *Attorney, Agent, or Firm* — Pierce Atwood LLP

(57) ABSTRACT

A system is configured to identify an entity referred to in speech or text by comparing the text of the entity mention to a database of the domain of the entity. The system may obtain a group of potential matches from the database and may then discriminatively rank those potential matches according to specific features identified for the context of the speech and/or text.

21 Claims, 7 Drawing Sheets

| Example Features | Type |
|---|---|
| Is it an exact match? | Boolean |
| Is m a substring of e? | Boolean |
| Is e a substring of m? | Boolean |
| Do the first characters of m and e match? | Boolean |
| Hamming distance between m and e | Real |
| Dice score between m and e | Real |
| Skip bigram score between m and e | Real |
| If m is a substring, its relative position in e | Real |
| FST-based string matching | Real |
| Aliases or nicknames | Boolean |
| Contextual information | Mixed |
| Spoken form normalization | Boolean |
| Feature combinations | Boolean |

FIG.6

ENTITY RESOLUTION WITH RANKING

BACKGROUND

Human-computer interactions have progressed to the point where humans can control computing devices, and provide input to those devices, by speaking. Computing devices employ techniques to identify the words spoken by a human user based on the various qualities of a received audio input. Such techniques are called speech recognition or automatic speech recognition (ASR). Speech recognition combined with natural language processing techniques may allow a user to control a computing device to perform tasks based on the user's spoken commands. The combination of such techniques may be referred to as speech processing. Speech processing may also convert a user's speech into text data which may then be provided to various textual based programs and applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Voice controlled systems rely on speech processing techniques to process audio into text that can then be interpreted by the system. Speech processing may include both automatic speech recognition (ASR), which converts audio into text, and natural language understanding (NLU), which analyzes the text to determine its meaning. The results of speech processing may be used to execute a wide variety of commands based on the input speech, such as controlling a device to play music, open an application, make a telephone call, etc.

Often a spoken command (or received textual input) may make reference to one or more entities. An entity is a real word person, place, thing, etc. Entity examples include a specific individual, city, state, song title, band name, restaurant, etc. Each entity is typically unique, such that one John Smith is a different entity from another John Smith, the artist E Street Band is a different entity from the artist Bruce Springsteen, is a different entity from the artist Bruce Springsteen and the E Street Band, etc. Each entity may be associated with a type or category (for example, person, musical artist, city, toy, or the like). Each entity may also have attributes depending on the category. For example, an individual may have attributes such as date of birth, age, children or the like whereas a toy may have attributes such as suggested retail price, recommended ages, place of manufacture or the like. Each entity is typically associated with a unique identifier, such as an ID number, that may be used by a system to differentiate between entities.

When an input is received that refers to an entity the system needs to first determine that the text (either received directly or obtained from the speech) actually refers to an entity. This process is called named entity recognition (NER). Once the system determines that an entity is referred to, the system then determines which entity is referred to. This process is called entity resolution, entity linking, or record linking NER and entity resolution may be considered part of NLU. Entity resolution ensures that an input is processed to refer to the correct entity, thus ensuring that when a user commands the system to "call John", "play the boss", or the like, the system calls the right "John", correctly interprets "the boss" as Bruce Springsteen, etc. Such different ways of referring to a same entity may be referred to as spoken form variants.

To improve a system's ability to correctly resolve entities, a system may be configured to identify a number of potential matches for a named entity, to then identify one or more features that describe the entity, and to choose from the potential matches using ranking techniques as described below. Although described below in the context of an audio sample, similar techniques may be performed for text received through any means.

Figure 1:
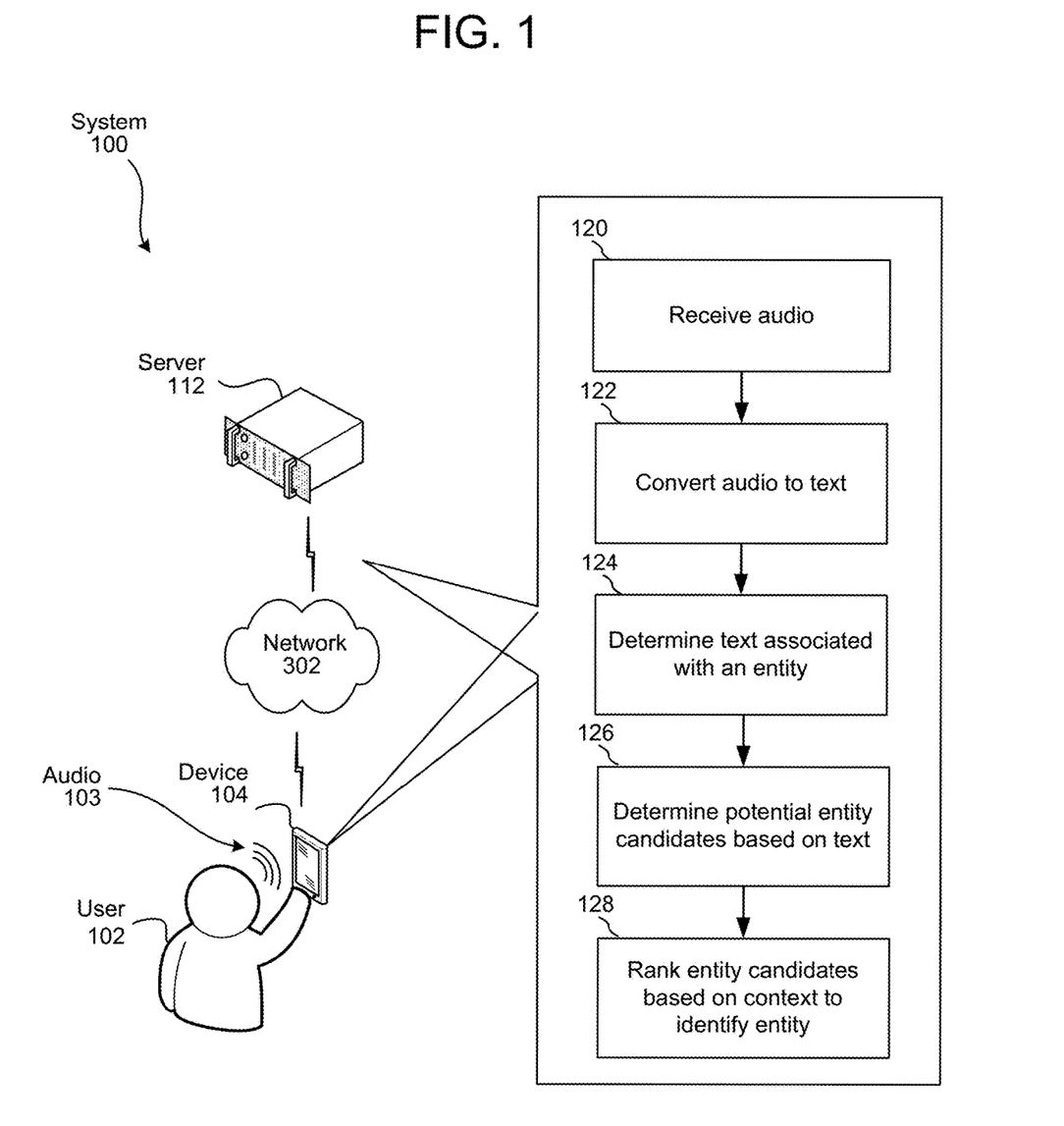
FIG. 1 illustrates a system for identifying an entity to associate with a text mention according to one aspect of the present disclosure.

FIG. 1 illustrates a system for identifying an entity in a segment of speech. The system includes server 112 connected to device 104 through network 302, which may be a wireless network, wired network, etc. The server 112 and device 104 may combine to perform steps 120-128 discussed below. The system 100 receives (120) audio 103, for example from a user 102 speaking into a microphone of device 104. The system 100 then converts (122) the audio to text. Next the system 100 determines (124) that a portion of the text corresponds to an entity. The system 100 then determines (126) a number of potential entity candidates based on the text and discriminatively ranks (128) the entity candidates to identify the entity. The ranking may be based on the context of the mention of the entity.

Further aspects of the above system are described below.

Figure 2A:
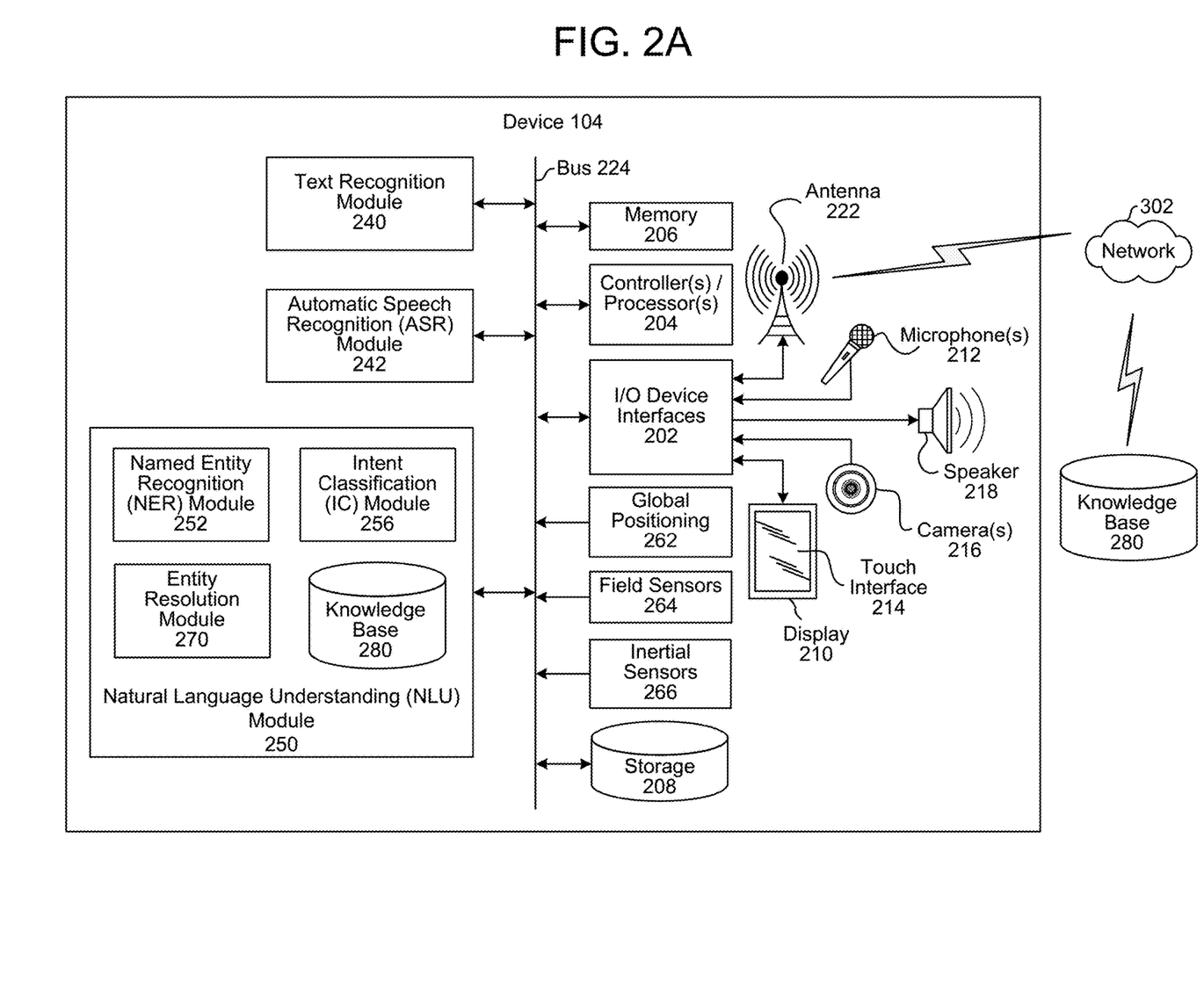
FIG. 2A is a block diagram conceptually illustrating a device for entity resolution according to one aspect of the present disclosure.
Figure 2B:
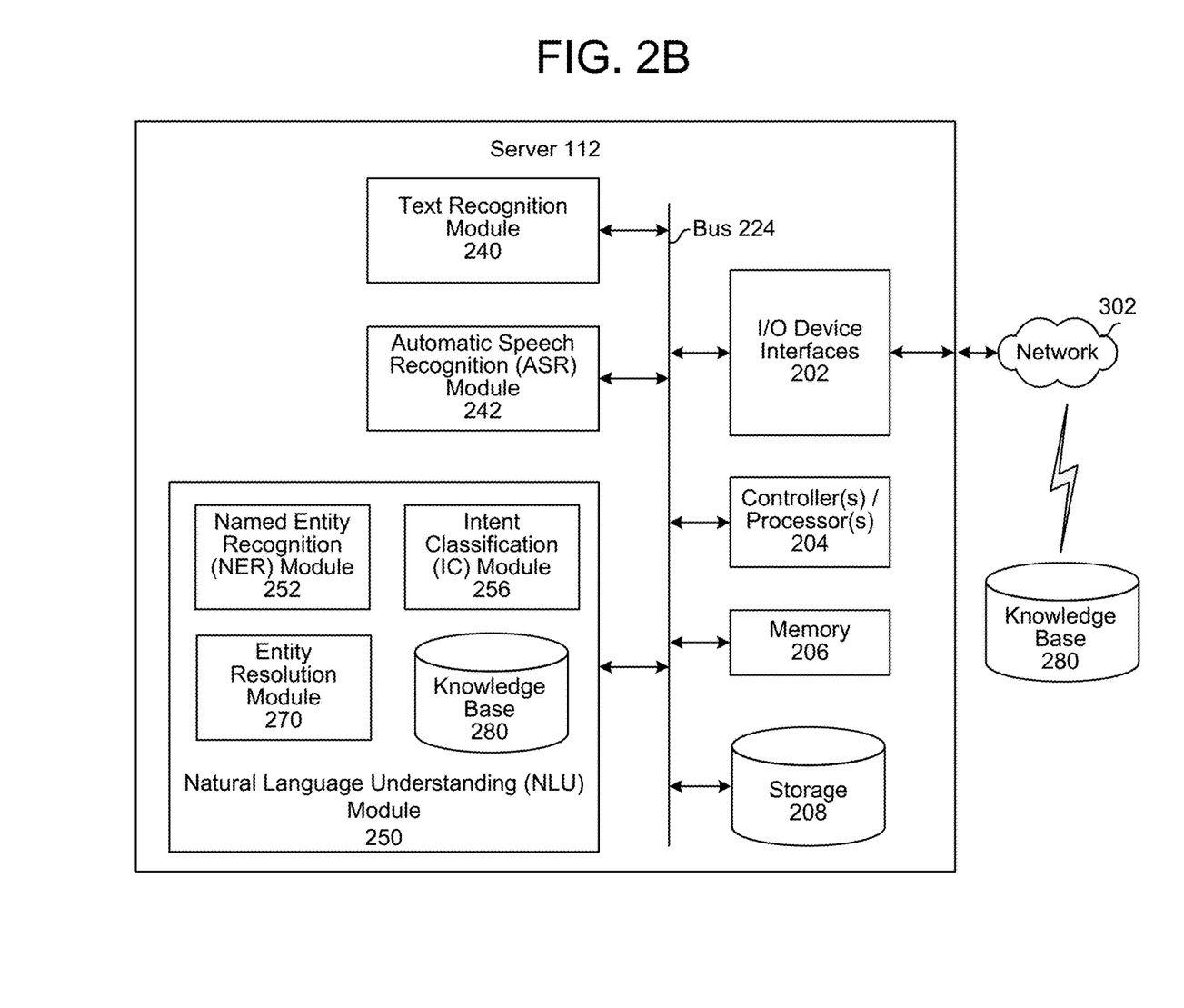
FIG. 2B is a block diagram conceptually illustrating a device for entity resolution according to one aspect of the present disclosure.

FIGS. 2A and 2B illustrate block diagrams conceptually illustrating components of a system 100. Depending upon how the system is structured, some of components illustrated in FIG. 2A as part of a device 104 or in FIG. 2B as part of a remote server 112 may be included only in the device 104 or in the server 112, or may be distributed across multiple devices 104 and/or servers 112. Other components not illustrated may also be included in the device 104 and/or server 112. In operation, the system 100 may include computer-readable and computer-executable instructions that reside in storage 208 on the device 104 and/or server 112. The device 104 may be a mobile device, such as a smart phone, tablet, smart watch, or the like. The server 112 may be a single server or a group of servers.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The device 104 may also be a component of other devices or systems that may provide speech processing functionality such as automated teller machines (ATMs), kiosks, home appliances (such as refrigerators, ovens, etc.), vehicles (such as cars, buses, motorcycles, etc.), and/or exercise equipment, for example.

The device 104 and/or server 112 may include one or more controllers/processors 204 comprising one-or-more central processing units (CPUs) for processing data and computer-readable instructions, and a memory 206 for storing data and instructions. The memory 206 may include volatile random access memory (RAM), non-volatile read only memory (ROM), non-volatile magnetoresistive (MRAM) and/or other types of memory. The device 104 and/or server 112 may also include a data storage component 208 for storing data and processor-executable instructions. The data storage component 208 may include one or more non-volatile storage types such as magnetic storage, optical storage, solid-state storage, etc. The device 104 and/or server 112 may also be connected to a removable or external non-volatile memory and/or storage (such as a removable memory card, memory key drive, networked storage, etc.) through the input/output device interfaces 202.

Executable instructions for operating the device 104 and/or server 112 and their various components may be executed by the controller(s)/processor(s) 204, using the memory 206 as temporary "working" storage at runtime. The executable instructions may be stored in a non-transitory manner in non-volatile memory 206, storage 208, or an external device. Alternatively, some or all of the executable instructions may be embedded in hardware or firmware in addition to or instead of software.

As shown in FIG. 2A, the device 104 may include one or more of a variety of sensors. Among the sensors are an audio capture component such as microphone(s) 114, an image and/or video capture component such as camera(s) 206, a touch interface 214, an antenna 222, global positioning sensors 262, field sensors 264 (e.g., a 3-axis magnetometer, a gravity sensor), and inertial sensors 266 (e.g., a 3-axis accelerometer, a 3-axis gyroscope). The device 104 may also include one or more buttons (not shown) or other input components such as a keyboard (not shown). Several of each of these components may be included. Also, although shown as integrated within device 104, some or parts of the various sensors may be external to device 104 (such as wireless headset 306 or 314, etc.) and accessed through input/output device interfaces 202 either wirelessly or through a physical connection. The sensors may produce output data that may be used in determining movement signatures, as explained below.

The antenna 222 and related components (e.g., radio transmitter/receiver/transceiver, modem, etc.) may be configured to operate with a network 302, for example a wireless local area network (WLAN) (such as WiFi), Bluetooth, and/or wireless networks, such as a Long Term Evolution (LTE) network, WiMAX network, 3G network, etc.

The audio capture component may be, for example, a microphone 212 or array of microphones, a wired headset (not illustrated), a wireless headset (e.g., wireless headset 306 or 314 in FIG. 3), etc. If an array of microphones is included, approximate distance to a sound's point of origin may be performed acoustic localization based on time and amplitude differences between sounds captured by different microphones of the array.

The touch interface 214 may be integrated with a surface of a display 210 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 262 provides an interface for acquiring location information, such as information from satellite geographic positioning system(s). For example, the global positioning module 262 may include a Global Positioning System (GPS) receiver and/or a Global Navigation Satellite System (GLONASS) receiver. The global positioning module 262 may also acquire location-based information using other radio sources (e.g., via antenna 222), such as mapping services that triangulate off of known WiFi service set identifiers (SSIDs) or cellular towers within range of the device 104.

The field sensor module 264 provides directional data. The field sensor module 264 may include a 3-axis magnetometer that measures magnetic fields and may serve as a compass. The field sensor module 264 may also include a dedicated gravity sensor to determine up-and-down. The inertial sensor module 266 provides inertial data, and may include 3-axis accelerometer and a 3-axis gyroscope. Examples of other sensors include an electronic thermometer to measure ambient temperature and a proximity sensor to detect whether there is an object within a certain distance of the device 104.

Sensors may be communicatively coupled with other components of device 104 via input/output (I/O) device interfaces 202 and/or via an address/data bus 224. The address/data bus 224 conveys data among components of the device 104 and/or server 112. Each component within the device 104 and/or server 112 may also be directly connected to other components in addition to (or instead of) being connected to other components across the bus 224.

The I/O device interfaces 202 may connect to a variety of components and networks. Among other things, the I/O device interfaces 202 may include an interface for an external peripheral device connection such as universal serial bus (USB), FireWire, Thunderbolt or other connection protocol. The input/output device interfaces 202 may also support a variety of networks via an Ethernet port and antenna 222.

The device 104 may also include a video output component for displaying images, such as display 210. The video output component may be a display of any suitable technology, such as a liquid crystal display, an organic light emitting diode display, electronic paper, an electrochromic display, a pico projector, etc. The video output component may be integrated into the device 104 or may be separate.

The device 104 may also include an audio output component such as a speaker 218, a wired headset (not illustrated), or a wireless headset (e.g., wireless headset 821). Other output devices include a haptic effect generator (not illustrated). The haptic effect generator may be of any haptic technology, including technologies to vibrate the entire device 104 (e.g., electromagnetic technologies such as vibratory motor or a coil with a central mass) and/or may comprise technologies allowing the haptic effect to be localized to a position of the touch interface 214, such as electroactive polymers, piezoelectrics, electrostatics, subsonic audio wave surface actuation, etc.

As discussed above, device 104 and/or server 112 includes controller(s)/processors 204, memory 206, and storage 208. In addition, the device 104 and/or server 112 may include a text recognition module 240, an automatic speech recognition (ASR) module 242, and a natural language understanding (NLU) module 250, each of which may comprise processor-executable instructions stored in storage 208 to be executed by controller(s)/processor(s) 204 (e.g., software, firmware, hardware, or some combination thereof. For example, components of the text recognition module 240, an ASR module 242, and NLU module 250 may be part of a software application running in the foreground and/or background on the device 104. In another example, a text recognition module 240 may reside on a device 104 whereas the ASR module 242 and NLU module 250 may reside on server 112. Other configurations are also possible.

Text recognition module 240 is configured to receive various inputs, such as video images, still images, emails, etc. and process those inputs to identify text. The identified text may then be passed to the NLU module 250 for further processing and execution by the system if appropriate. The text recognition module 240 may implement a number of techniques to identify and recognize text such as optical character recognition (OCR) or other techniques.

The ASR module 242 may process received audio including speech into text. The ASR module 242 transcribes audio data into text data representing the words of the speech contained in the audio data. The text data may then be used by other components for various purposes, such as executing system commands, inputting data, etc. Audio data including spoken utterances may be processed in real time or may be saved and processed at a later time. A spoken utterance in the audio data is input to the ASR module 242 which then interprets the utterance based on the similarity between the utterance and models known to the ASR module 242. For example, the ASR module 242 may compare the input audio data with models for sounds (e.g., subword units or phonemes) and sequences of sounds to identify words that match the sequence of sounds spoken in the utterance of the audio data. The different ways a spoken utterance may be interpreted may each be assigned a probability or a recognition score representing the likelihood that a particular set of words matches those spoken in the utterance. The recognition score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Based on the considered factors and the assigned recognition score, the ASR module 242 may output the most likely words recognized in the audio data. The ASR module 242 may also output multiple alternative recognized words in the form of a lattice or an N-best list with corresponding probability scores.

The ASR module 242 may be connected to the bus 224, input/output interfaces 202, controller/processor 204, NLU module 250, and/or other component of the device 140 and/or server 112. Audio data sent to the ASR module 242 may come from the input/output interfaces 202, such as audio data captured by a device 104 and sent to the server 112 over a network.

The ASR module 242 may include an acoustic front end (AFE) and a speech recognition engine. The AFE transforms audio data into data for processing by the speech recognition engine. The speech recognition engine compares the speech recognition data with the acoustic, language, and other data models and information for recognizing the speech contained in the original audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The speech recognition engine may process the output from the AFE with reference to information stored in speech storage. Alternatively, post front-end processed data (such as feature vectors) may be received by the ASR module 242 from another source besides the internal AFE. For example, another entity, such as local device 140, may process audio data into feature vectors and transmit that information to the server 112 across a network 302. Feature vectors may arrive at the server 112 encoded, in which case they may be decoded prior to processing by the speech recognition engine The speech recognition engine attempts to match received feature vectors to language phonemes and words as known in the speech storage. The speech recognition engine computes recognition scores for the feature vectors based on acoustic information and language information. The acoustic information is used to calculate an acoustic score representing a likelihood that the intended sound represented by a group of feature vectors match a language phoneme. The language information is used to adjust the acoustic score by considering what sounds and/or words are used in context with each other, thereby improving the likelihood that the ASR module outputs speech results that make sense grammatically.

The speech recognition engine may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the ASR module 242 to another component of the device 104 and/or server 112 or to the input/output interfaces 202 for sending to an external device. For example, ASR results in the form of a textual representation of the speech, an N-best list, lattice, etc. may be sent to a natural language understanding (NLU) module 250 for natural language processing, such as conversion of the text into commands for execution.

The NLU module 250 may include various components, including potentially dedicated processor(s), memory, storage, etc. As illustrated in FIGS. 2A and 2B, the NLU module may include a named entity recognition (NER) module 252, intent classification (IC) module 256, entity resolution module 270, and knowledge base 280. In one embodiment the knowledge base 280, or portions thereof, may be located separately from device 104 and/or server 112, as illustrated in FIGS. 2A and 2B and further discussed below. The NLU module 250 may also include other components not illustrated. The NLU module 250 takes textual input (such as from text recognition module 240, ASR module 242, or otherwise) and attempts to make a semantic interpretation of the text. That is, the NLU module 250 determines the meaning behind the text based on the individual words and then implements that meaning. The NLU module 250 interprets a text string (such as the text output by the ASR module 242) to derive an intent or a desired action from the user as well as the pertinent pieces of information in the text that allow the device 104 and/or server 112 to complete that action. For example, if a spoken utterance is processed by an ASR module and outputs the text "call mom" the NLU module 250 will determine that the user intended to activate a telephone in his/her device and to initiate a call with a contact matching the entity "mom." The NLU module 250 may be configured to annotate text as part of NLU processing. For example, for the text "call mom," "call" may be annotated as a command (to execute a phone call) and "mom" may be identified as a specific entity and target of the command (and the telephone number for the entity corresponding to "mom" stored in a contact list may be included in the annotation). To correctly perform NLU processing of speech input the NLU may be configured to communicate with a variety of other components/applications of a device such as a phone, contact list, calendar, music player, etc.

The NLU processing is based on the models and programming available to the NLU module 250. Such models may be grammar based, rule based or constructed in a different manner. The NLU may store one or more training corpuses that may include precoded text and/or the corresponding commands that go with the text, that may be used to train and improve the models used by the NLU module 250 in natural language understanding. The training corpuses may be used to train the NLU models, which may then be used during NLU processing. The NER module 252, IC module 256, and entity resolution module 270 may each make use of their own model(s), which may be trained separately from other models used by components of the NLU module 250.

In this manner the NLU module 250 may initiate instructions to other components/applications of a device in order to perform actions the NLU modules 250 determines have been commanded by a user. NLU processing may be performed by a local device 104 or by a remote device, such as server 112. If performed by a remote device, the remote device may then send instructions to the local device to perform operations based on the NLU results. Or results of the command may be sent to the local device 104 from the server 112. For example, if the command is to play music from a cloud music service, the music may be sent from the server 112 to the local device 104.

Figure 3:
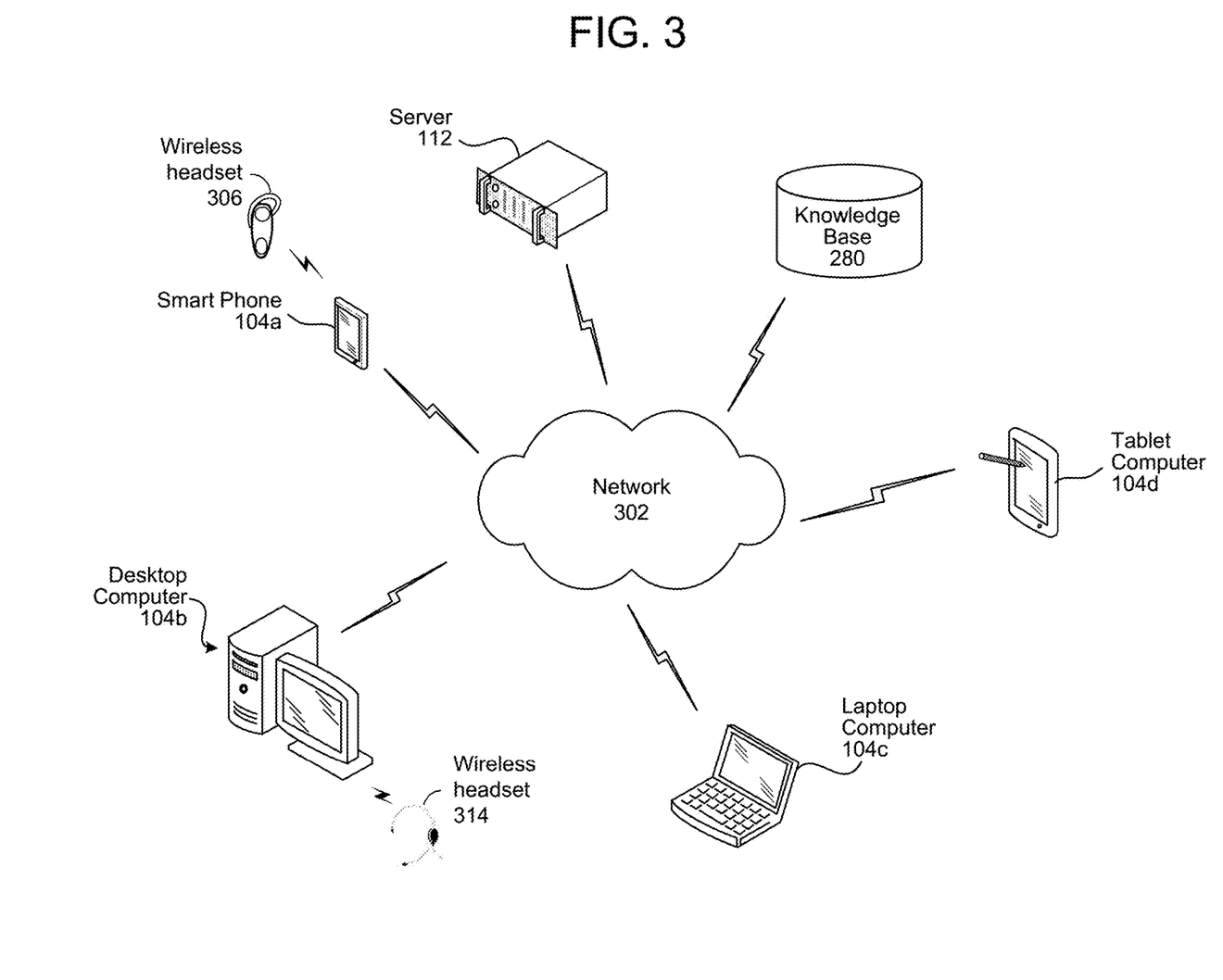
FIG. 3 illustrates a computer network for use with entity resolution according to one aspect of the present disclosure.

As shown in FIG. 3, multiple devices may be connected over a network 302. Network 302 may include a local or private network or may include a wide network such as the internet. Devices may be connected to the network 302 through either wired or wireless connections. For example, a smart phone 104a may be connected to the network 302 through a wireless service provider. Other devices, such as desktop computer 104b, may connect to the network 302 through a wired connection. Other devices, such as laptop computer 104c or tablet computer 104d may be capable of connection to the network 302 using various connection methods including through a wireless service provider, over a WiFi connection, or the like. Networked devices may input spoken audio through a number of audio input devices including through headsets 306 or 314. Audio input devices may be connected to networked devices either through a wired or wireless connection. Networked devices may also include embedded audio input devices, such as an internal microphone (not pictured) in laptop computer 104c, smart phone 104a, or tablet computer 104d.

In certain speech processing system configurations, one device may capture an audio signal and other device(s) may perform the speech processing. For example, audio input to the headset 314 may be captured by desktop computer 104b and sent over the network 302 to server 112 for processing. Or desktop computer 104b may partially process the audio signal before sending it over the network 302 to server 112. In another aspect, the speech capture, ASR, and NLU processing may all be performed on different devices. Because speech processing may involve significant computational resources, in terms of both storage and processing power, such split configurations may be employed where the device capturing the audio has lower processing capabilities than a remote device and higher quality results are desired. The audio capture may occur near a user and the captured audio signal sent to another device for processing.

An NLU module 250 may receive a wide variety of textual inputs that should result in a wide variety of executed commands. For example, a user may instruct a device to "call mom" to activate a phone program and start a call to a contact labeled "mom", "play poker" to activate a poker game program, "what is the weather in Chicago" to activate device locating data, cross reference that with weather data and display the weather data to a user and/or activate a weather application, etc. Further, an NLU module 250 may receive two very similar textual inputs that should result in different executed commands. For example, a textual input of "play the rolling stones" may result in the NLU module 250 generating commands for a device to activate a music playing program and beginning playing a playlist called "the rolling stones" (or begin playing selections of the artist "Rolling Stones"). The same textual input, however, may also result in the NLU module 250 generating commands for a device to activate a game application called "The Rolling Stones."

To properly process a textual input, an NLU module 250 may perform various operations such as determining a domain of the textual input (that is, categorizing the textual input into one or more categories), determining an intent of the textual input (such as determining the intent of the user in the command, such as play music), recognizing that an entity is referred to in a textual input, determining a type of the entity referred to, identifying the specific entity referred to (also called entity resolution), or other operations. These operations may be performed in various orders and by various components depending on system configuration.

As illustrated, the NLU module 250 may include a named entity recognition (NER) module 252 that determines whether a textual input includes reference to an entity. In certain embodiments the NER module 252 may not determine the precise entity that is referred to (this process is discussed below in reference to the entity resolution module 270), but may determine that an entity is referred to in the text. Text that includes reference to an entity may be referred to as a mention or a written form or surface form of the entity. The text including the mention may be referred to as the mention string. The mention string may include just the mention, or may include some surrounding text as well. The surrounding text may be used by various components to assist their processing.

The NER module 252 receives the textual input, compares the input with its available models and determines how (and whether) to classify each word and whether a particular word or combination of words refers to an entity. This process may include semantic tagging, which is the labeling of a word or combination of words according to their type/semantic meaning. For example, a word may be tagged as a command (such as a command to play music), as an entity (or even more specifically, as a music band), or the like depending on the capabilities of the NER module 252. The models available to the NER module 252 may be based on training data which include samples of input text, their corresponding semantic tags, example domains, etc. A NER model may be constructed using techniques such as hidden Markov models, maximum entropy models, log linear models, conditional random fields (CRF), and the like.

The NLU module 250 may also include an intent classification (IC) module 256. The IC module 256 identifies an intent associated with a particular textual input. The intent is a classification that generally represents the command of the textual input. Sample intents may include "play music," "query calendar," "get directions," or the like. The IC module 256 receives the tagged textual input and compares that input with its known models to determine the intent to associate with a particular text input. An IC model may be constructed as a classifier and use techniques such as a support vector machine, and the like. For each input text section the IC module 256 may determine a list of potential intents to associate with the text, where each potential intent has an associated score representing the likelihood that a particular intent should be chosen. The intent with the highest score may be chosen and output by the IC module 256, or the IC module 256 may output an N-best list of potential tags and/or their respective scores. Although illustrated as NER being performed prior to IC, other processing orders are also possible. For example, the NLU module 250 may first classify the intent, and then recognize named entities using the classified intent.

In addition to determining intent, an IC module 256, NER module 252, or other component may also identify a domain for a particular textual input. A domain is larger category describing the textual input. Sample domains may include calendar, music, games, communication (e.g., email, texting, etc.), queries, etc. Each domain may be associated with one or more applications associated with a user's device. Choosing a domain may assist the NLU module 250 with executing the correct commands most closely associated with the user's intent when speaking a command.

The NLU module 250 may also include an entity resolution module 270 and knowledge base 280. The entity resolution module 270 takes entities recognized by the NER module 252 and resolves them, that is matches each entity mention to a specific individual entity stored in the knowledge base 280. This is an important problem to solve, as an incorrectly identified specific entity may result in an improperly executed command. Thus the entity resolution module 270 may match a specific entity in a mention to a specific entity, potentially in a canonical form, that can then be referenced by downstream processes (for example, playing music, instituting a telephone call, etc.) so those processes operate on the correct entity.

Entity resolution may be treated like a capped search problem and performed similarly to search engine results. That is, the text corresponding to the entity is processed and potential matches to the text are found. Those matches may be ranked or scored to indicate a likelihood that a particular potential match is the referred to entity. This method can frequently lead to errors. Even if certain contextual data is considered during the search (such as domain, intent, or the like) the search results may not produce the correct match. This may be due to a number of reasons related to the difficult of entity resolution.

One obvious difficulty with entity resolution is that a mention string may be polysemous, that is a single mention string may potentially refer to multiple different entities. For example, a mention "John" may refer to many different entities (including potentially a bathroom), "Springfield" may refer to a person, a city, etc. Another difficulty is that multiple different mentions, name variations, aliases, etc. may refer to the same entity. For example mentions "the boss", "bruce", "springsteen" may all refer to the entity Bruce Springsteen. And even those may refer to multiple entities, for example "springsteen" may also refer to the entity "Bruce Springsteen and the E Street Band (a different canonical entity) or "the boss" may refer to the speaker's employer, depending on the circumstances. Another difficulty is potential variation in the mention caused by such things as ASR errors, noise, etc. For example, a speaker with a strong accent may say "John" but that may be transcribed as "Jean" by the ASR module 242. Another difficulty is that written and spoken forms of a mention may be different, yet may refer to the same entity. For example, musical artist Deadmau5 may be verbalized as "dead mouse" or musical artist P!nk verbalized as "pink." Correct entity resolution desirably accounts for all or some of for such difficulties and variations. Other difficulties and potential challenges also exist.

Figure 4:
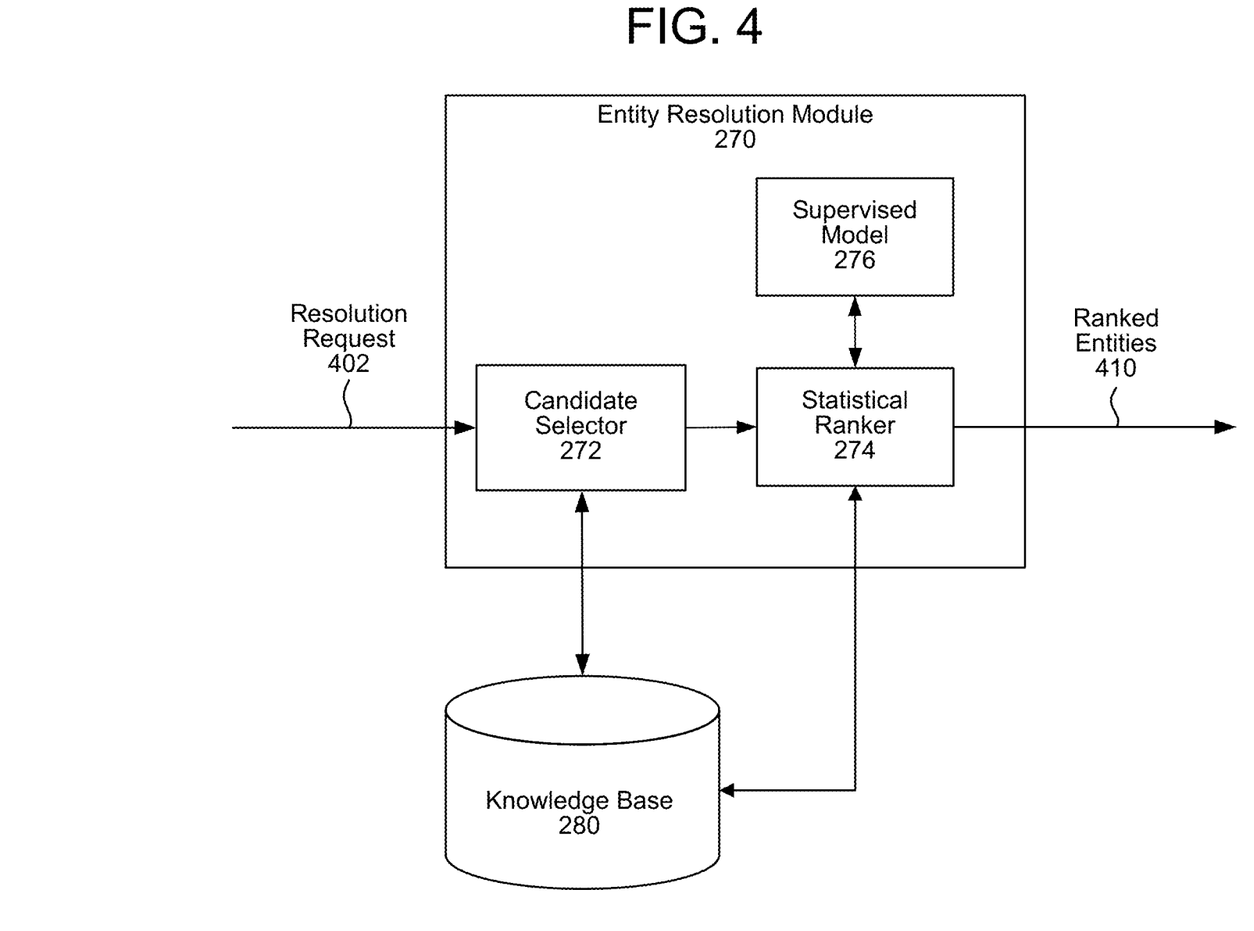
FIG. 4 is a block diagram conceptually illustrating components for entity resolution according to one aspect of the present disclosure.

To improve entity resolution, a new method and system are offered. In the present system the entity resolver may perform multiple stages of operations to determine potential matches for an entity mention. As illustrated in FIG. 4, first an entity resolution module 270 may receive a resolution request input 402 including the mention string, various context data, or other data, describing additional information about the entity. The resolution request input 402 may be sent to the entity resolution module 270 from various components, such as the NER module 252, IC module 256, or other component of the NLU module 250 or device 104 or server 112. The context data may include various information relating to the context of the mention. For example, the context data may include the category or type of the entity, the words surrounding the entity mention, the domain, the intent, or entities mentioned in the text, or the like. The context data may also include other information related to the context of the mention that may be useful in resolving the entity such as an identifier of a user associated with the entity mention, a location associated with the mention (for example, where the user's device was when the user spoke the audio that included the entity mention), or the like. This context data may be considered by the entity resolution module 270.

After receiving the resolution request input 402, the entity resolution module 270 may query the knowledge base 280 to obtain a number of potential candidate matches for the entity mention. Then the entity resolver may determine one or more feature types to use to judge the relevance of each potential candidate to the entity mention. The feature types may be selected based on the entity type, the domain, information in the context data, or other factors. The entity resolution module may then rank the potential candidate matches using the selected feature types, for example using a statistical ranker 274 and a supervised model 276. The ranked entities 410, or the top ranked potential match, may then be output and/or selected as a match for the entity mention. These operations are described further below.

The knowledge base 280 used by the entity resolution module 270 may be, to the extent possible, an exhaustive collection of entities, in their canonical form, that may be referenced by an entity mention. As discussed above, a knowledge base 280 may include various data sources that may be separately located but are in communication with the entity resolution module 270. Specific portions of the knowledge base 280 may be used for different domains or entity types (e.g., one portion for musicians, another for actors, etc.), Each entity may be stored in the knowledge base as an entity record along with a unique identifier corresponding to the entity, a record of attributes of the entity, entity type, other entities related to the particular entity, or other entity data. The knowledge base 280 may be a relational database management system (RDBMS) or other data store. The knowledge base 280 may also include different knowledge bases from various data sources such as publicly available data sources (Wikipedia, Freebase, a phonebook, etc.), private data sources (such as a user's music catalog, the Amazon product catalog, gazetteers (i.e., entity lists), etc.), or other sources. Such sources may be in a variety of different formats and may be organized in a number of different ways.

The knowledge base 280 may include components to execute various functionality, such as a processor, associated memory, etc. that may be used to execute queries that are sent to the knowledge base 280 from the candidate selector 272. A query from the candidate selector 272 may include the mention string, context data, or other information from the resolution request input 402 so that the knowledge base 280 may assist in determining the first selection of potential matches, such as by executing a capped search. The candidate selector 272 may perform various operations such as transforming the mention string into a form operable by the particular knowledge base 280.

The first pass search (whether performed by the candidate selector 272, knowledge base 280, or some other component) may include partial matches and may result in a plurality of potential matching entities, each with a confidence score. The higher the confidence score, the more the potential candidate is deemed relevant to the entity mention of the query. This first pass search allows the entity resolution module 270 to reduce an entity search with potentially millions of matches, to a smaller, more manageable set of potential matches that may be ranked using the statistical ranker 274. For example, a discriminative ranking may be based, at least in part, on the confidence scores of the first pass search. By breaking the entity resolution into two processes, a first search by the candidate selector 272 and a discriminative ranking by the statistical ranker 274, the entity resolution may incorporate detailed considerations (done by the statistical ranker 274 as described below) but may do so relatively quickly by virtue of the initial pruning of the search set and identification of potential entity candidate matches (done by the candidate selector 272).

The statistical ranker 274 receives as inputs various information including the potential matches, associated confidence scores, entity mention, context data, and/or other information. The statistical ranker 274 may also have access to the knowledge base 280 or other knowledge sources. The statistical ranker 274 then takes the potential matches and re-ranks them using a discriminative model to produce an N-best list of potential entities. The N-best list (which may include only the top match or a group of ranked potential matches) may be returned to the application or otherwise output from the NLU module 270 and further processed by the system.

The statistical ranker 274 uses a discriminative model trained in a supervised fashion to learn the relevance of a candidate with regard to the entity mention. The use of a trained model may make the system robust to various noises, such as noise in the catalog data, the noise in input data, and noise in the knowledge base retrieval. The discriminative training (further discussed below) allows specific feature types to be configured for matching candidates to entity mentions. The features are data points used to determine how closely each potential mention in the plurality of potential matching entities corresponds to the entity mention. Certain specific feature types may be used in situations where those features are likely to result in a correct answer, whereas other features may be used in different situations. Feature types may be configured specific to certain domains, intents, contexts, etc. Thus the feature types actually used may depend on the entity type being resolved, the input modality (speech vs. text vs. visual), the nature of the knowledgebase, such as whether the knowledge base is closed (e.g., a gazetteer of U.S. presidents) vs. open-ended (e.g., a gazetteer of musicians), clean vs. noisy input, and so on.

During entity resolution, the statistical ranker 274 may select one or more feature types to use when ranking the candidate entities against the entity mention. The statistical ranker 274 may select feature types based on context data, mention string, or other considerations. A feature may describe a relationship between the potential matching entity and the entity mention. A feature may also describe other relationships between the entity mention (or a portion thereof) and other factors, such as surrounding text, other context data, previous user behavior, etc. Each feature may have a value that may be numeric, Boolean (e.g., true or false), or some other type. By using multiple feature types to rank the candidate entities, the statistical ranker 274 may provide significantly more robust entity resolution results than other solutions, such as solutions based exclusively on the mention string.

Figure 5:
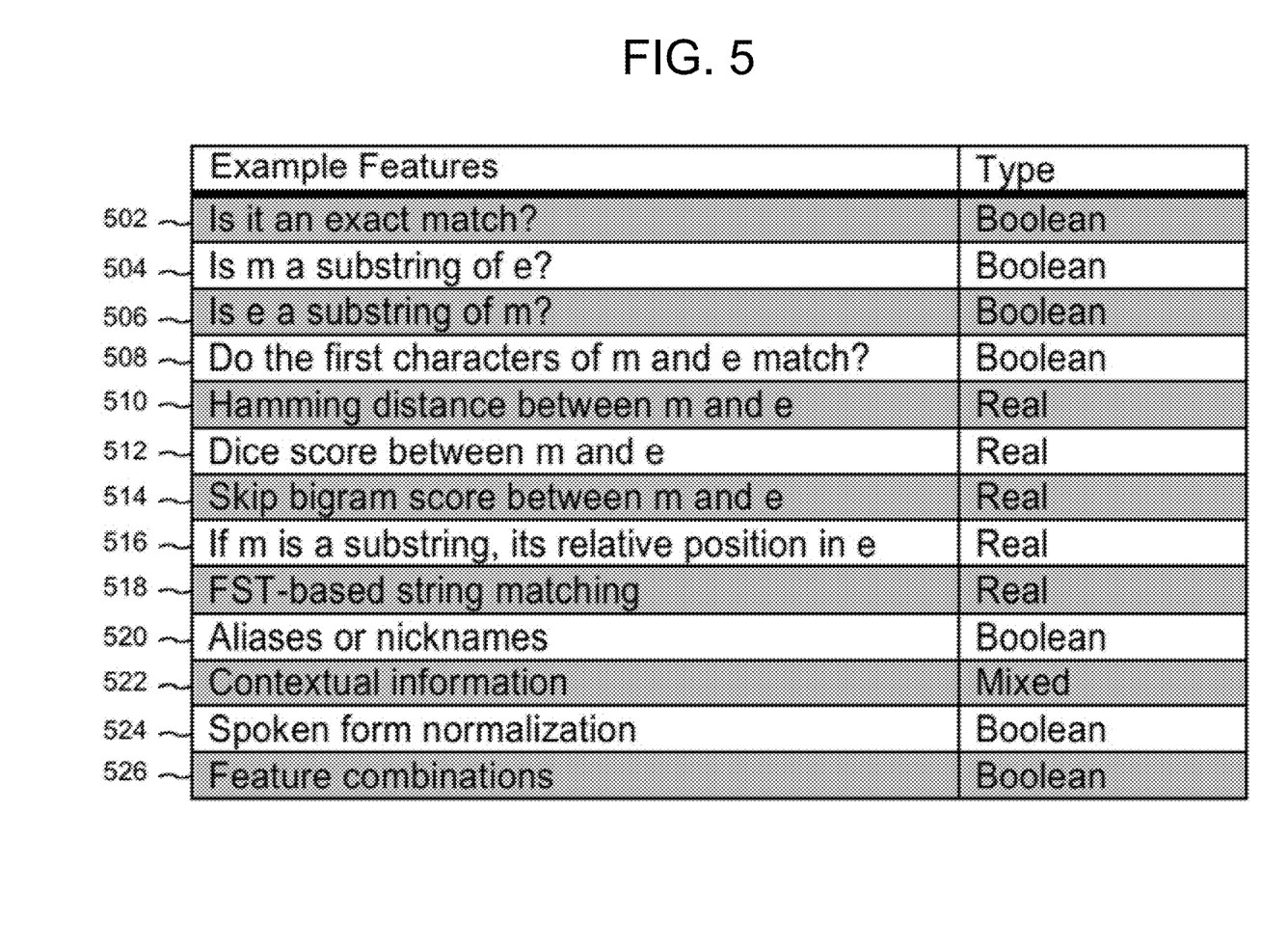
FIG. 5 is an illustration of certain feature types that may be used for ranking according to one aspect of the present disclosure.

FIG. 5 illustrates a number of example feature types that each may have one or multiple values depending on the feature. As used in several examples, "m" represents the mention string (i.e., the text associated with the entity found in the input text) and "e" represents the candidate entity (i.e., the text associated with the entity name as found in the knowledge base). Feature 502 describes whether the mention string is an exact match to the candidate entity. Feature 504 describes if the mention string is a substring of the candidate entity. For example, "Springsteen" in the input text may be a subset of "Bruce Springsteen", one of the potential entity candidate matches found in the knowledge base. Feature 506 describes if the candidate entity is a subset of the mention string. Feature 508 describes if the first characters of the candidate entity match the mention string. Feature 510 describes the Hamming distance between the candidate entity match the mention string. The Hamming distance measures the number of positions at which the corresponding text strings are different. Feature 512 describes the dice score (i.e., association strength) between the candidate entity match the mention string. Feature 512 describes the skip bigram between the candidate entity match the mention string. The skip bigram is a pair of closest consecutive words with the connecting word missing. For example for the string of words "fried green tomatoes", "fried tomatoes" would be a skip bigram. Feature 516 describes, if the mention string is a substring of the candidate entry, the mention string's relative position in the candidate entity. Feature 518 describes results of string matching using a finite state transducer (FST). FSTs may be trained to generate and score orthographic alternatives. For example, a string of "LBJ" may be changed to "LB Johnson", "Lyndon B Johnson" or "Lyndon Baines Johnson" for purposes of comparison. This FST can be configured various data sources (for example Wikipedia, etc.). The resulting FST may be used assign a score to any string pair by summing over all alignments and scoring all enclosed character n-grams. These scores are then combined using a log-linear model to produce a global FST-based similarity score. Feature 520 may describe whether a particular text string may have an alias, nickname, or the like. Such aliases or nicknames (e.g., "the boss" being an alias for "Bruce Springsteen") may be used when comparing an entity mention to a candidate entity. Feature 522 describes context information, such as the context data discussed above. Feature 524 may indicate if the string involves a spoken form normalization. For example, for the spoken form "one oh one point two fm" the system may generate text of "101.2 FM". Other features may include entity type, authority type, utterance text, surrounding text, whether the entity mention matches any spoken form variants of an entity, popularity of the entity, relevance-score returned by the candidate selector, or other information. Feature 526 represents feature combinations that may be trained to assist in feature resolution. Often, individual features are more informative when combined, for example, "did the first characters match" and "the word before was Florida", etc. Multiple feature combinations may be configured depending on what feature combinations are likely to assist in entity resolution. Configuration of such combinations (or of individual features) may be based on the training set.

The statistical ranker 274 may give a score to each of the plurality of potential entity matches received from the candidate selector 272. The score may correspond to the confidence of the statistical ranker 274 that the particular candidate is a correct match. The individual scores may be used to rank the plurality of potential entity matches and may be output with the N-best list. The N-best list may also include other information, such as canonical names, entity ID numbers, etc.

The statistical ranker 274 may be trained using any number of different machine learning techniques. For example, the statistical ranker 274 may use one or more trained supervised models 276 to generate and score features for each candidate entity. The supervised models 276 may be trained in a discriminative or a generative fashion. One advantage of using a discriminative model is that features that are configured and tailored for various situations may be incorporated without having to specify a joint distribution over the features (also known in machine learning literature as a "generative story"). The models 276 may be trained from annotation/training data in a supervised fashion. Annotators may manually select entities in a knowledge base and select and/or annotate canonical entities with a wide variety of information that may be incorporated into the system and used to train the model 276 along with various machine learning techniques. The training may account for a variety of difficulties or variables, such as noise from ASR results, noise or errors in the knowledge base, noise from a search engine used by the candidate selector 272, name variations, entity ambiguity, missing entities, context information, or other considerations.

The statistical ranker 274 may use one or more different techniques to rank the candidate entities. For example, the statistical ranker 274 may use a discriminative ranking technique. Discriminative ranking refers to modeling the predictor variable and the features by specifying a conditional distribution of the predictor given the features. The statistical ranker 274 may also use a generative ranking technique. Corresponding generative methods may specify a joint distribution instead of the conditional distribution. This joint distribution is highly problem-specific and may be difficult to configure. The statistical ranker 274 may use pointwise ranking, where ranking is reduced to a pointwise regression problem. The statistical ranker 274 may use pairwise ranking, where a binary classifier produces a list of ordered pairs and a final rank order is constructed from this list. The statistical ranker 274 may use listwise ranking, where the optimal ranking is considered as a search problem in the space of all possible permutations. The statistical ranker 274 may also use other ranking techniques.

Figure 6:
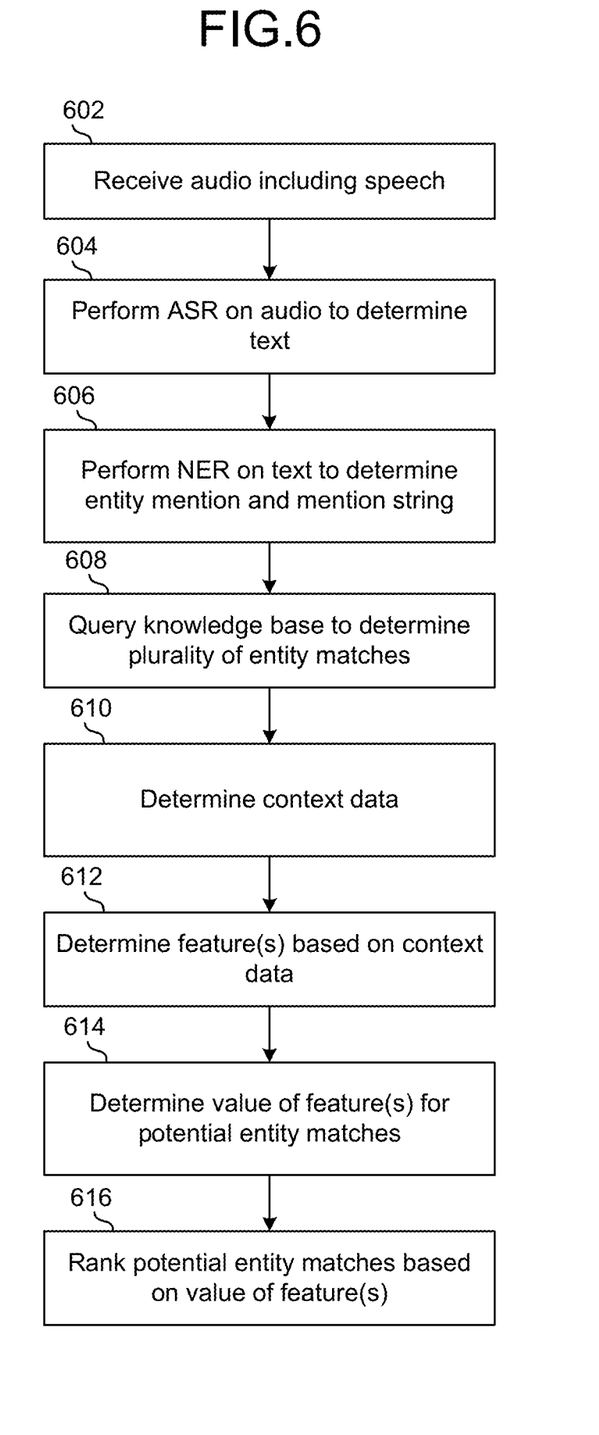
FIG. 6 illustrates a method for entity resolution according to one aspect of the present disclosure.

In one aspect of the present disclosure, a system may identify an entity as shown in FIG. 6. A system may receive (602) audio including speech. The system may perform (604) ASR on the audio to determine text. The system may (606) perform NER on the text to determine that the text includes an entity mention and to identify the mention string. The system may query (608) a knowledge base to determine a plurality of potential entity matches. The system may determine (610) context data relating to the entity mention. The system may determine (612) one or more features based on the context data. The system may determine (614) the value of the feature(s) for the potential entity matches and may rank (616) and score the potential entity matches based on the value of the feature(s). The system may then send the ranked entities, or a single entity to a component or application for execution of a function based on one or more ranked entities. Such functions may include playing music, making a telephone call, creating a calendar entry, querying an application, or the like.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the speech recognition techniques described herein may be applied to many different languages, based on the language information stored in the speech storage.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A system for identifying an entity, the system comprising:
   at least one processor;
   at least one memory including instructions, that when executed by the at least one processor, cause the system to perform a set of actions comprising:

receiving audio data including a representation of speech;

performing speech recognition on the audio data to obtain text data;

determining that a text segment in the text data corresponds to a reference to a potential candidate entity;

identifying, using an entity database comprising a plurality of entities, a first potential entity corresponding to the text segment and a second potential entity corresponding to the text segment;

determining context data relating to the text data, the context data comprising at least one of words in the text data, an entity type associated with the first potential entity and second potential entity, a quality of the audio data, or a domain associated with the text data;

selecting a feature type based at least in part on the context data, the feature type describing a relationship between the text data and a potential entity;

processing, using the feature type, the first potential entity and the text segment to determine a first relevance score corresponding to a first likelihood that the text segment includes a representation of the first potential entity;

processing, using the feature type, the second potential entity and the text segment to determine a second relevance score corresponding to a second likelihood that the text segment includes a representation of the second potential entity;

determining that the first relevance score is greater than the second relevance score; and selecting, based at least in part on determining that the first relevance score is greater than the second relevance score, the first potential entity as the entity corresponding to the text data.

2. A computer-implemented method comprising:

determining that input text data includes a reference to a potential candidate entity;

determining first text data representing a first candidate entity that potentially corresponds to the reference;

determining second text data representing a second candidate entity that potentially corresponds to the reference;

selecting a feature type based at least in part on the first candidate entity and the second candidate entity, the feature type corresponding to a relationship between the reference and the potential candidate entity;

processing, using the feature type, the input text data and the first text data to determine a first relevance score corresponding to a first likelihood that the input text data includes a representation of the first candidate entity;

processing, using the feature type, the input text data and the second text data to determine a second relevance score corresponding to a second likelihood that the input text data includes a representation of the second candidate entity;

ranking the first candidate entity and the second candidate entity based on the first relevance score and the second relevance score; and determining, based at least in part on the ranking, that the input text data includes a representation of an entity.

3. The computer-implemented method of claim 2, wherein the first candidate entity and second candidate entity are identified using a database of entities, and wherein the method further comprises identifying the database based at least in part on the first candidate entity and the second candidate entity.

4. The computer-implemented method of claim 2, further comprising:

selecting, based at least in part on the first candidate entity and the second candidate entity, a second feature type from among a plurality of feature types associated with the first candidate entity and the second candidate entity.

5. The computer-implemented method of claim 2, further comprising receiving context data associated with the input text data, wherein the feature type is selected further based at least in part on the context data.

6. The computer-implemented method of claim 5, wherein the context data comprises at least one of words in the input text data, a quality of the input text data, and a domain associated with the input text data.

7. The computer-implemented method of claim 2, further comprising:

executing a function corresponding to the entity.

8. The computer-implemented method of claim 2, wherein the feature type includes at least one of a Hamming distance, association strength, skip bigram determination, indication of a substring relationship, or string match determination.

9. The computer-implemented method of claim 2, wherein:

determining the first candidate entity and determining the second candidate entity is performed by a candidate selector, and determining the first relevance score and the second relevance score is performed by a statistical ranker.

10. The computer-implemented method of claim 2, further comprising:

determining a first confidence score corresponding to a likelihood that the first candidate entity corresponds to the input text data; and determining a second confidence score corresponding to a likelihood that the second candidate entity corresponds to the input text data.

11. The computer-implemented method of claim 10, wherein:

the first confidence score is greater than the second confidence score, and the first relevance score is greater than the second relevance score.

12. The computer-implemented method of claim 2, wherein determining the first relevance score comprises:

determining, using a finite-state transducer (FST), a first score corresponding to a first alignment of the reference and the first candidate entity;

determining, using the FST, a second score corresponding to a second alignment of the reference and the first candidate entity; and processing, using a log-linear model, the first score and the second score.

13. A computing device, comprising:

at least one processor; and at least one memory including instructions that, when executed by the at least one processor, cause the computing device to:

determine that input text data includes a reference to a potential candidate entity;

determine first text data representing a first candidate entity that potentially corresponds to the reference;

determine second text data representing a second candidate entity that entity potentially corresponds to the reference;

select a feature type based at least in part on the first candidate entity and the second candidate entity, the feature type corresponding to a relationship between the reference and the potential candidate entity;

processing, using the feature type, the input text data and the first text data to determine a first relevance score corresponding to a first likelihood that the input text data includes a representation of the first candidate entity;

processing, using the feature type, the reference and the second candidate entity to determine a second relevance score corresponding to a second likelihood that the input text data includes a representation of the second candidate entity;

rank the first candidate entity and the second candidate entity based on the first relevance score and the second relevance score; and determine, based at least in part on the ranking, that the input text data includes a representation of an entity.

14. The computing device of claim 13, wherein the first candidate entity and second candidate entity are identified using a database of entities, and wherein the at least one processor is further configured to identify the database based at least in part on the first candidate entity and the second candidate entity.

15. The computing device of claim 13, wherein the at least one memory further includes instructions that, when executed by the at least one processor, further cause the computing device to select, based at least in part on the first candidate entity and the second candidate entity, a second feature type from among a plurality of feature types associated with the first candidate entity and the second candidate entity.

16. The computing device of claim 13, wherein the at least one memory further includes instructions that, when executed by the at least one processor, further cause the computing device to receive context data associated with the input text data, and wherein the feature type is selected further based at least in part on the context data.

17. The computing device of claim 16, wherein the context data comprises at least one of words in the input text data, a quality of the input text data, or a domain associated with the input text data.

18. The computing device of claim 13, wherein the instructions to rank the first candidate entity and second candidate entity comprise ranking the first candidate entity above the second candidate entity and wherein the at least one processor is further configured to execute a function corresponding to the entity.

19. The computing device of claim 13, wherein the feature type includes at least one of a Hamming distance, association strength, skip bigram determination, indication of a substring relationship, or string match determination.

20. The computing device of claim 13, wherein the at least one memory further includes instructions that, when executed by the at least one processor, further cause the computing device to:

determine the first candidate entity and determining the second candidate entity is performed by a candidate selector, and determine the first relevance score and the second relevance score is performed by a statistical ranker.

21. The computing device of claim 13, wherein the at least one memory further includes instructions that, when executed by the at least one processor, further cause the computing device to:

determine a first confidence score corresponding to a likelihood that the first candidate entity corresponds to the input text data; and determine a second confidence score corresponding to a likelihood that the second candidate entity corresponds to the input text data.

* * * * *